(12) United States Patent
Grudzien

(10) Patent No.: US 7,757,563 B2
(45) Date of Patent: Jul. 20, 2010

(54) CAPACITANCE MANOMETERS AND METHODS OF MAKING SAME

(75) Inventor: Chris P Grudzien, Haverhill, MA (US)

(73) Assignee: MKS Instruments, Inc., Andover, MA (US)

( * ) Notice: Subject to any disclaimer, the term of this patent is extended or adjusted under 35 U.S.C. 154(b) by 0 days.

(21) Appl. No.: 12/100,634

(22) Filed: Apr. 10, 2008

(65) Prior Publication Data

US 2009/0255342 A1 Oct. 15, 2009

(51) Int. Cl.
*G01L 13/02* (2006.01)
*G01L 9/12* (2006.01)
(52) U.S. Cl. ..................................... 73/716
(58) Field of Classification Search .............. 73/716, 73/718, 724
See application file for complete search history.

(56) References Cited

U.S. PATENT DOCUMENTS 3,557,621 A * 1/1971 Ferran ........................ 73/718
3,948,102 A * 4/1976 Coon .......................... 73/724
4,785,669 A * 11/1988 Benson et al. ............... 73/718
4,823,603 A * 4/1989 Ferran et al. ................ 73/724
5,992,240 A * 11/1999 Tsuruoka et al. ............ 73/718
6,151,967 A 11/2000 McIntosh et al.

OTHER PUBLICATIONS

Fujitsu Limited, Fujitsu Develops World's First Technologies Enabling Formation and Multi-Layering of High Dielectric Constant Ceramic Film on Resin Circuit Boards, 2004, 5pp.

* cited by examiner

*Primary Examiner*—Andre J Allen
(74) *Attorney, Agent, or Firm*—McDermott Will & Emery LLP

(57) ABSTRACT

A capacitance manometer comprises: a flexible diaphragm including a first electrode structure; an electrode structure including second and third spaced-apart electrode structures secured relative to the diaphragm so as to establish a capacitance between the first electrode structure and the second electrode structure and a capacitance between the first electrode structure and the third spaced-apart electrode structure, wherein the capacitances between the first electrode structure and each of the second and third electrode structures change with changes in differential pressure placed on opposite sides of the flexible diaphragm; and a thick film dielectric material disposed between the first electrode and each of the second and third spaced-apart electrode structures so as to increase the gain in capacitance of the manometer without decreasing the distance between the first electrode structure and each of the second and third electrode structures and without increasing the stroke of the flexible diaphragm, while preventing the first electrode structure from shorting with either the second or third electrode structure in response to over pressurization conditions.

10 Claims, 2 Drawing Sheets

CAPACITANCE MANOMETERS AND METHODS OF MAKING SAME

RELATED APPLICATIONS

None

FIELD OF THE DISCLOSURE

The present application relates to pressure transducers for measuring pressure, and more particularly to improvements in capacitive manometers in order to increase output signal gain without decreasing the distance between the capacitive measuring components, without increasing the stroke of the flexible diaphragm, and eliminating shorting between the capacitive measuring components.

BACKGROUND OF THE DISCLOSURE

Pressure transducers have been employed in a myriad of applications. One such transducer is the capacitive manometer which provides very precise and accurate measurements of pressure of a gas, vapor or other fluid. Applications include high-precision gas and vapor delivery systems, which have become very important in many industrial applications, for example in the semiconductor industry for wafer and chip fabrication, although other applications are known. Such fluid delivery systems typically include, but are not limited to, devices such as mass flow controllers (MFCs) and mass flow verifiers (MFVs) for regulating and/or monitoring the flow of gases and vapors.

Capacitive manometers typically use (a) a flexible diaphragm forming or including an electrode structure and (b) a fixed electrode structure spaced from the diaphragm so as to establish capacitance there between. Variations in pressure on one side of the diaphragm relative to the pressure on the opposite side of the diaphragm causes the diaphragm to flex so that the capacitance between the electrode structure of the diaphragm and the fixed electrode structure varies as a function of this differential pressure. Usually, the gas or vapor on one side of the diaphragm is at the pressure being measured, while the gas or vapor on the opposite side of the diaphragm is at a known reference pressure, whether at atmosphere or some fixed high or low (vacuum) pressure, so that the pressure on the measuring side of the diaphragm can be determined as a function of the capacitance measurement.

Many applications requiring extremely low vacuum pressures have been and continue to be developed resulting in the need for capacitive manometers capable of measuring such low vacuum pressures. However, increasing the sensitivity of capacitive manometers to provide very accurate pressure measurements at low vacuum pressures poses several design challenges. In order to measure extremely low vacuum pressures, capacitive manometers require very narrow gaps between the flexible diaphragm and the fixed electrode structure so that they can detect small changes in pressure. Such narrow gaps establish a relatively small predefined base capacitance when the diaphragm is in the zero position. Consequently, a relatively small flexure of the diaphragm due to a small change in differential pressure will provide a detectable change in capacitance, known as stroke capacitance. However, making the gap smaller to make the manometer more sensitive increases the chances that over pressurization can occur causing the diaphragm electrode to directly contact the opposing electrode structure. The contact results in an electrical short between the opposing electrode components, with an increase in power usage causing heat to be generated by both the contacting electrode components and the elements used to deliver and regulate the power to the electrode components. The heat can cause the diaphragm to thermally expand, distorting the diaphragm so that upon relaxation of the diaphragm (under conditions where the pressure is the same on both sides of the diaphragm), the diaphragm returns to an incorrect non-zero position, and only slowly creeps back to the zero position as the diaphragm returns to its proper temperature.

SUMMARY

Summarizing, a capacitance manometer comprises:
a flexible diaphragm including a first electrode structure;
an electrode structure including second and third spaced-apart electrode structures secured relative to the diaphragm so as to establish a capacitance between the first electrode structure and the second electrode structure and a capacitance between the first electrode structure and the third spaced-apart electrode structure, wherein the capacitances between the first electrode structure and each of the second and third electrode structures change with changes in differential pressure placed on opposite sides of the flexible diaphragm; and
a thick film dielectric material disposed between the first electrode and each of the second and third spaced-apart electrode structures so as to increase the gain in capacitance of the manometer without decreasing the distance between the first electrode structure and each of the second and third electrode structures, and without increasing the stroke of the flexible diaphragm, while preventing the first electrode structure from shorting with either the second or third electrode structure in response to over pressurization conditions.

GENERAL DESCRIPTION OF THE DRAWING

DETAILED DESCRIPTION OF THE DRAWING

Figure 1:
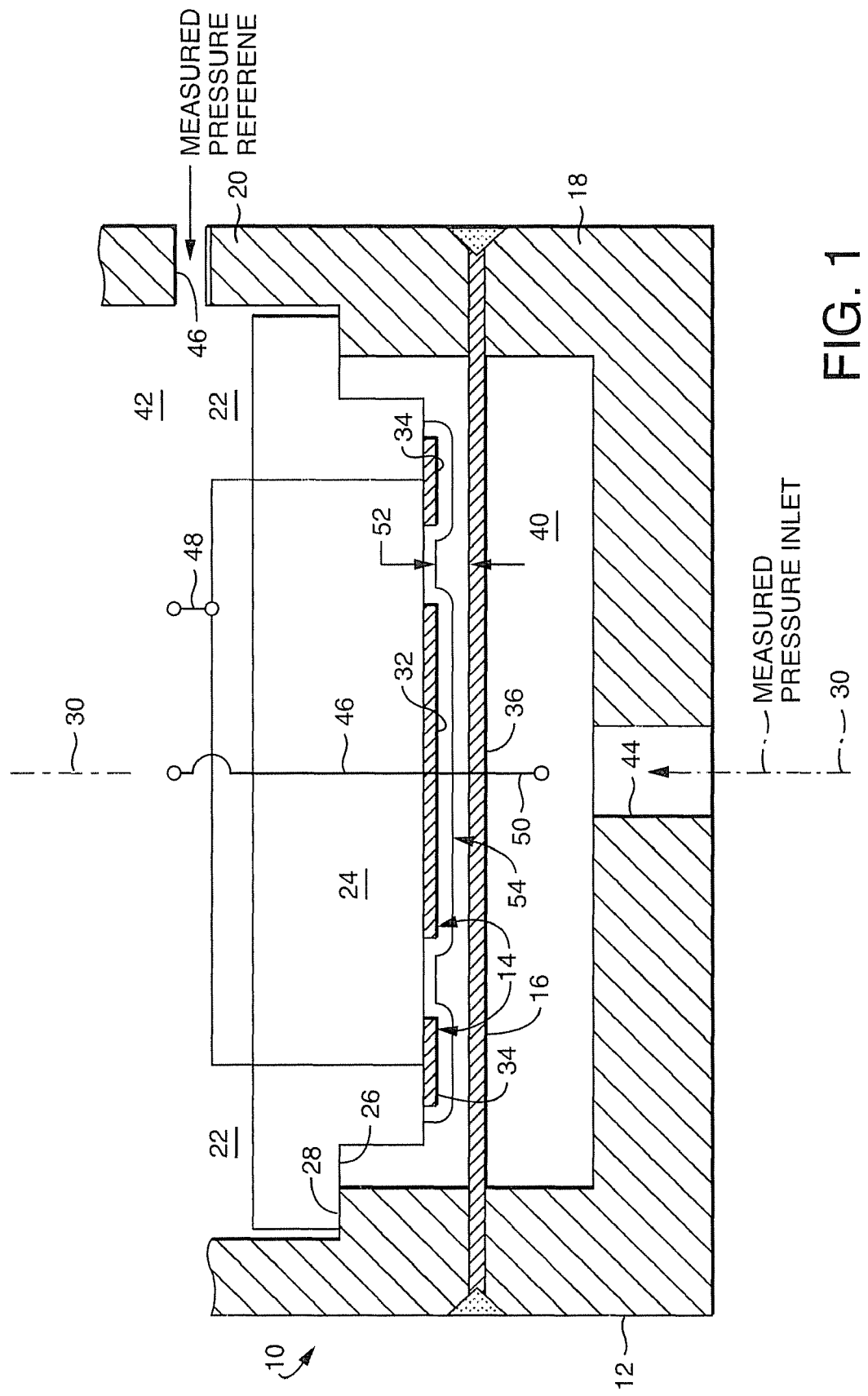
FIG. 1 shows a cross section, partially cut away, of a typical capacitance manometer designed according to the present disclosure.
Figure 3:
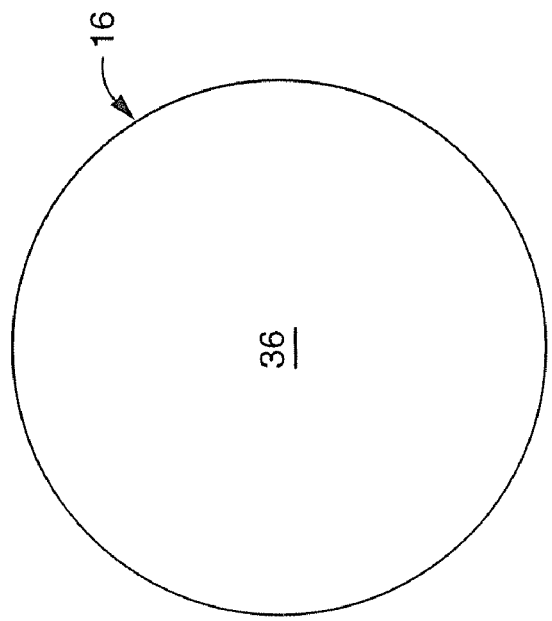
FIG. 3 shows a cross section along section line 3-3 in FIG. 1.
Figure 2:
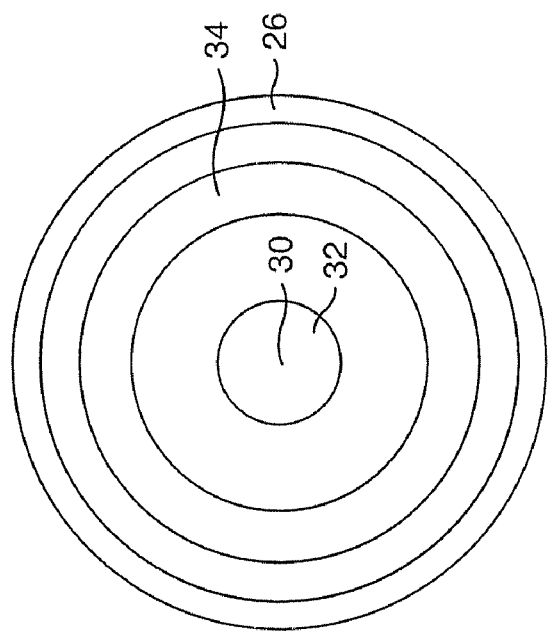
FIG. 2 shows a cross section through the manometer shown in FIG. 1 taken along section line 2-2 in FIG. 1.

Capacitance manometer 10 shown in the drawing includes a housing 12 for supporting fixed electrode structure 14 and flexible diaphragm 16. The housing 12 can include process housing portion 18 and reference housing portion 20. In the illustrated embodiment, process housing portion 18 and reference housing portion 20 include an open volume 22 for receiving and supporting the fixed electrode structure 14 and flexible diaphragm 16 in a predetermined relationship. As shown, the fixed electrode structure 14 is supported on a substrate 24 made from an electrically insulative material, such as a ceramic material, and formed into a rigid, non-flexible structure. A shoulder 26 can be provided in periphery of the substrate 24 for engaging opposing shoulder 28 formed in the housing 12, and secured in place with any suitable locking or otherwise secure arrangement. In one embodiment the size and shape of the substrate 24 can be such that the substrate can be adjusted laterally on the shoulder 28 of the housing 12 so that the center of the fixed electrode structure 14 can be centered on a central axis 30 of the open volume 22. Specifically, the electrode structure 14 includes a center electrode 32 concentrically position relative to the center axis 30, and an outer electrode 34 preferably in the form of a ring concentric with the center electrode 32 and the center axis 30.

Diaphragm 16 is either made of or is provided with a layer or coating of suitable conductive material so as to form a common electrode, indicated by numeral 36. Diaphragm 16 is secured to the housing so as create process chamber 40 on one side of the diaphragm and reference chamber 42 on the other side of the diaphragm. The diaphragm is secured to the housing so as to seal the process chamber 40 from the reference chamber 42 so that the two chambers can be maintained at different pressures. The gas or vapor to be measured can be introduced into process chamber 40 through a gas inlet 44 provided in the process housing portion 18. The reference housing 42 can be provided with a second gas inlet 46 for introducing a gas at a reference pressure into the reference chamber from a source, or at ambient pressure from the surrounding atmosphere. Thus, reference chamber 42 contains a gas or vapor at a predefined reference pressure.

Center and outer electrodes 32 and 34 are preferably flat electrodes disposed on the surface of the substrate 24 so that the electrodes preferably all lie in the same plane. Suitable electrical leads 46, 48 are respectively provided for the center and outer electrode 32 and 34, while an electrical lead 50 is provided for the common electrode of diaphragm 16. The leads are suitably connected to a capacitance measurement device (not shown).

Diaphragm 16 is preferably secured within the housing so that the plane defined by the common electrode 36 is substantially parallel to the plane of the center and outer electrodes 32 and 34 when the pressure is the same on both sides of the diaphragm, i.e., there is zero differential pressure. When a gas or vapor introduced through inlet 44 into the process chamber 40 is at a different pressure from the reference pressure in reference chamber 42, the diaphragm will flex and the capacitance between the common electrode 36 and the center electrode 32 will define one capacitance different from the capacitance between the common electrode 36 of the diaphragm and the outer electrode 34. It should be appreciated that by centering the center electrode 32 with respect to the common electrode 36 on axis 30, and making the outer (ring) electrode 34 structure concentric with the center electrode 32, the capacitance between the outer electrode 34 and the common electrode 36 will be substantially uniform around the outer (ring) electrode regardless of the differential pressure. The pressure in the process chamber 20 is thus a function of the measured capacitance between the common electrode 36 of the diaphragm and the center electrode 36 and the measured capacitance between the common electrode 36 of the diaphragm and the outer (ring) electrode 34.

As such, predefined capacitances are established between the common electrode structure 36 formed by diaphragm 16 and each of the center and outer electrodes 32 and 34, such that when the differential pressure on the diaphragm is zero, the structure defines a measurable "base" capacitance. In addition, when the diaphragm is exposed to the maximum measurable differential pressure the common electrode structure 36 of the diaphragm will be deflected relative to the electrodes 32 and 34 so as to define the "stroke" of the sensor. The stroke capacitance is the full scale value (which is a function of the maximum measurable difference between the capacitance between common electrode 36 and the center electrode 32 and the common electrode and the outer electrode 34), minus the measured base capacitance.

The base capacitance is thus defined by the distance between the plane of the common electrode structure (when in the relaxed zero position) and the plane of center and outer electrodes, indicated at gap 52, with the gas or vapor in the reference chamber 36 at the same pressure as the measured gas or vapor in the process chamber 40. Capacitance manometers designed for measuring very low vacuum pressures must be very sensitive to very small changes in pressure in order to provide accurate measurement readings. As a result the spacing between the plane of the common electrode of the diaphragm and the plane of the center and outer electrodes must be very small so that small changes in the diaphragm in response to changes in the differential pressure can be detected. This close positioning, however, can result in shorting of the common electrode and the center and/or outer electrodes under conditions when the diaphragm is subjected to over pressurization. Thin layers of glass having thickness of 20 to 200 nm has been used in capacitive sensors to minimize shorting, but can cause higher inter-electrode and stray capacitances and have no effect on capacitance values. See U.S. Pat. No. 6,151,967 (McIntosh et al.).

As further shown in the FIG. 1, a high dielectric material 54 is provided between the common electrode structure and each of the center and outer electrodes so as to increase output signal gain of the capacitance manometer without decreasing the distance between the capacitive measuring components, and without increasing the stroke of the flexible diaphragm forming one of the capacitive measuring components.

By carefully selecting the dielectric material so as to provide a predetermined dielectric value presented by the preselected thickness and knowledge of the dielectric material, the dielectric material will increase both the starting or base capacitance of the device, as well as the full scale capacitance thereby increasing the stroke (full scale minus the base). If the diaphragm is over pressured and touches the dielectric, it cannot short against the electrodes, thus eliminating the issue of diaphragm heating and the subsequent slow return to zero. By selecting the proper dielectric, corrosive media can be introduced into the reference chamber 38, during a differential pressure measurement for example, without damage to the electrodes. Thus, by introducing a high dielectric material (defined as having a dielectric constant of >1.0) the device achieves "gain" in capacitance, eliminates shorting (and therefore slow return to zero). An added benefit is achieved by selecting a proper material that can also protect the electrodes from corrosive media.

The dielectric material is preferably disposed on the center and outer electrodes so that it remains rigid during operation of the manometer, but could also be disposed on the common electrode of the diaphragm, or even secured between the two under certain applications.

Figure 4:
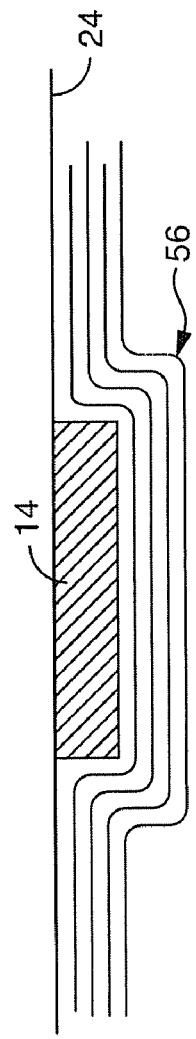
FIG. 4 shows a cross section, partially cut-away, through the fixed electrode structure showing another embodiment comprising multiple layers of dielectric material disposed on the fixed electrode structure.

The dielectric material may be applied as a thick film in accordance with any one of a number of methods. The dielectric material is applied as a thick film well in excess of 200 nm. The term "thick film" as used herein is therefore any film that is greater that 1 micron in thickness. The high dielectric material 54 is preferably of a predetermined thickness in excess of one micron, with the exact thickness depending on the dielectric material and the desired range of capacitance measurement values for the device, at least between the diaphragm and the center electrode and between the diaphragm and the ring electrode. The high dielectric material can be applied as a single layer or coating, or applied as multiple layers 56 of one or more dielectric materials to achieve the desired thickness and dielectric value. See FIG. 4. It should be noted that the dielectric material can be provided only where necessary and excluded from or minimized in undesirable areas. The only areas where the thickness of the dielectric material 40 is critical is the areas between the common electrode 36 of diaphragm 16 and the center electrode 32, and between the common electrode 36 of diaphragm 16 and the outer electrode 34.

Method of applying thick films include direct printing, using traditional printing methods, for example, applying a binder to a uniform film of non-fuse ceramic or glass powder using an inkjet printer. The ceramic film is then dried, bonding only the areas that have been treated with the binder. The remaining ceramic powder is easily removed and the ceramic film fired. Stencil or screening process, where a material is forced through a stencil or screen that has been masked to generate a "positive" image on the substrate. See, for example, http://en.wikipedia.org/wiki/Silkscreening. The film can also be sprayed into place. See for example, reference http://www.fujitsu.com/global/news/pr/archives/month/2004/20040806-01.html.

While this disclosure has been particularly shown and described with references to preferred embodiments thereof, it will be understood by those skilled in the art that various changes in form and details may be made therein without departing from the spirit and scope of the disclosure as defined by the following claims.

What is claimed is:

1. A capacitance manometer comprising:
    a flexible diaphragm including a first electrode structure;
    an electrode structure including second and third spaced-apart electrode structures secured relative to the diaphragm so as to establish a capacitance between the first electrode structure and the second electrode structure and a capacitance between the first electrode structure and the third spaced-apart electrode structure, wherein the capacitances between the first electrode structure and each of the second and third electrode structures change with changes in differential pressure placed on opposite sides of the flexible diaphragm; and
    a thick film dielectric material disposed between the first electrode and each of the second and third spaced-apart electrode structures so as to increase the gain in capacitance of the manometer without decreasing the distance between the first electrode structure and each of the second and third electrode structures, and without increasing the stroke of the flexible diaphragm, while preventing the first electrode structure from shorting with either the second or third electrode structure in response to over pressurization conditions;
    wherein the dielectric material is a coating disposed on the second and third electrode structures, between the diaphragm and the second and third electrode structures.

2. A manometer according to claim 1, wherein the coating includes a plurality of layers of the dielectric material.

3. A manometer according to claim 1, wherein the coating is uniform in thickness.

4. A manometer according to claim 1, wherein the second electrode is a center electrode and the third electrode is a ring electrode concentric with and spaced from the center electrode.

5. A manometer according to claim 4, wherein the dielectric material is disposed between the diaphragm and the center electrode and between the diaphragm and the ring electrode, and omitted between diaphragm and the space in between the center electrode and the ring electrode so as to minimize inter capacitance effects relating to the dielectric material.

6. A manometer according to claim 1, wherein the dielectric material is in contact with and seals the second and third electrode structures and is selected so as to protect the second and third electrodes from corrosive materials introduced in the manometer.

7. A manometer according to claim 1, wherein the second and third electrodes are coplanar with one another and in parallel with the first electrode structure when the diaphragm is in the zero position.

8. A manometer according to claim 1, wherein the dielectric material is chosen so as to increase the base capacitance and full scale capacitance of the manometer.

9. A manometer according to claim 1, wherein the dielectric material has a thickness greater than 1 micron.

10. A capacitance manometer comprising:
    a flexible diaphragm including a first electrode structure;
    an electrode structure including second and third spaced-apart electrode structures secured relative to the diaphragm so as to establish a capacitance between the first electrode structure and the second electrode structure and a capacitance between the first electrode structure and the third spaced-apart electrode structure, wherein the capacitances between the first electrode structure and each of the second and third electrode structures change with changes in differential pressure placed on opposite sides of the flexible diaphragm; and
    a thick film dielectric material disposed between the first electrode and each of the second and third spaced-apart electrode structures so as to increase the gain in capacitance of the manometer without decreasing the distance between the first electrode structure and each of the second and third electrode structures, and without increasing the stroke of the flexible diaphragm, while preventing the first electrode structure from shorting with either the second or third electrode structure in response to over pressurization conditions;
    wherein the second electrode is a center electrode and the third electrode is a ring electrode concentric with and spaced from the center electrode, and the dielectric material is disposed between the diaphragm and the center electrode and between the diaphragm and the ring electrode, and omitted between diaphragm and the space in between the center electrode and the ring electrode so as to minimize inter capacitance effects relating to the dielectric material.

* * * * *